United States Patent
Park et al.

(10) Patent No.: US 8,379,859 B2
(45) Date of Patent: Feb. 19, 2013

(54) METHOD AND APPARATUS FOR CIPHERING DATA IN WIRELESS COMMUNICATION SYSTEM

(75) Inventors: Sejin Park, Suwon-si (KR); Yong Kim, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 351 days.

(21) Appl. No.: 12/786,953

(22) Filed: May 25, 2010

(65) Prior Publication Data

US 2010/0303237 A1 Dec. 2, 2010

(30) Foreign Application Priority Data

May 26, 2009 (KR) .................. 10-2009-0046009

(51) Int. Cl.
*G06F 12/14* (2006.01)
*H04K 1/00* (2006.01)
*H04Q 5/22* (2006.01)

(52) U.S. Cl. ...................... 380/270; 340/10.42
(58) Field of Classification Search .................. None
See application file for complete search history.

(56) References Cited

U.S. PATENT DOCUMENTS

| | | | |
|---|---|---|---|
| 2002/0147021 A1* | 10/2002 | June | 455/452 |
| 2004/0156385 A1 | 8/2004 | Fischer et al. | |
| 2005/0220302 A1 | 10/2005 | Mironov et al. | |
| 2008/0130892 A1* | 6/2008 | Funnell et al. | 380/270 |
| 2010/0277287 A1* | 11/2010 | Choi et al. | 340/10.42 |

* cited by examiner

*Primary Examiner* — Shin-Hon Chen
(74) *Attorney, Agent, or Firm* — The Farrell Law Firm, P.C.

(57) ABSTRACT

An apparatus for ciphering data in a wireless communication system. The apparatus includes a memory which stores data to be ciphered; a controller which outputs a cipher command for each layer of a wireless protocol; a protocol processing unit including a cipher hardware, which receives the cipher command outputted from the controller, reads data to be ciphered from the memory, ciphers the data and outputs the ciphered data, and a transmission data processing unit, which receives ciphered data that is directly outputted from the cipher hardware, adds a header for transmission and generates a data packet; and an RF communication unit which directly receives the generated data packet and transmits the received data packet.

8 Claims, 6 Drawing Sheets

METHOD AND APPARATUS FOR CIPHERING DATA IN WIRELESS COMMUNICATION SYSTEM

PRIORITY

This application claims priority under 35 U.S.C. §119 to Korean Patent Application No. 10-2009-0046009, which was filed in the Korean Intellectual Property Office on May 26, 2009, the content of which is incorporated herein by reference.

BACKGROUND OF THE INVENTION

1. Field of the Invention

The present invention generally relates to a method and apparatus for ciphering data in a wireless communication system, and more particularly, to a method and apparatus for ciphering data, which transmits ciphered data directly to a Radio Frequency (RF) communication unit, which operates at the physical layer, without transmitting the data to a memory, using a protocol processing unit which can simultaneously perform ciphering and transmission data processing.

2. Description of the Related Art

In W-CDMA (Wideband Code Division Multiple Access) and HSPA (High Speed Packet Access) of 3GPP ($3^{rd}$ Generation Partnership Project), the ciphering process of security level 1 is stipulated to process in each protocol and layer of RRC (Radio Resource Control)/RLC (Radio Link Control)/MAC (Media Access Control). Here, security level 1 refers to a security level in a layer, where a terminal and a base station directly transmit and receive data.

With respect to a layer where ciphering is processed, in the RRC layer, a control message is transmitted, and in the RLC/MAC layer, user data is transmitted. Particularly, the method of transmitting data when transmitting user data is classified into UM (Unacknowledge Mode), AM (Acknowledge mode) and TM (Transparent Mode), and UM/AM mode data are ciphered in RLC layer and TM mode data are ciphered in MAC sub-layer.

Further, the existing method of implementing ciphering can be classified into a method of using software and a method of using hardware. When ciphering is implemented using software, the controller of a transceiver (a terminal or a base station) should read and cipher data stored in a memory, and then store the data in the memory again. Such a method can be easily implemented in case the data transmission rate does not have to be as high as in control message processing, but the processing time can be delayed if high data transmission rate is needed.

Additionally, if the case ciphering is implemented in hardware, if the controller of a transceiver transmits information for ciphering data stored in a memory to a cipher hardware, the cipher hardware reads data from the memory, ciphers the data, and stores the ciphered data in the memory again. Such a method is a general ciphering method that is used to process data with a high transmission rate.

However, in order to transmit data, a MAC packet needs to be generated by adding a MAC header to the ciphered data. To this end, the cipher hardware should access a memory again and read ciphered data. Thus, the number of times of memory accessed by the cipher hardware increases, thereby finally delaying the data processing.

Hence, there is a need for a method of ciphering data, which can quickly perform data ciphering and transmission processing.

SUMMARY OF THE INVENTION

The present invention has been made in view of the above problems, and provides a protocol processing unit, which can simultaneously perform ciphering and transmission data processing. The protocol processing unit is implemented by hardware logic, and ciphered data can be directly transmitted to an RF communication unit by adding a MAC header without transmitting the data to a memory.

In accordance with an aspect of the present invention, an apparatus for ciphering data in a wireless communication system includes a memory, which stores data to be ciphered; a controller, which outputs a cipher command for each layer of a wireless protocol; a protocol processing unit including a cipher hardware, which receives the cipher command outputted from the controller, reads data to be ciphered from the memory, ciphers the data and outputs the ciphered data, and a transmission data processing unit, which receives ciphered data that is directly output from the cipher hardware, adds a header for transmission and generates a data packet; and an RF communication unit which directly receives the generated data packet and transmits the received data packet.

In accordance with another aspect of the present invention, a method of ciphering data in a wireless communication system includes reading data to be ciphered from a memory when receiving a cipher command by a cipher hardware; ciphering the read data and directly outputting the ciphered data to a transmission data processing unit by the cipher hardware; directly receiving the output ciphered data and generating a data packet by adding a header for transmission by the transmission data processing unit; and directly receiving the generated data packet transmitted from the transmission data processing unit and transmitting the received data packet by an RF communication unit.

According to the present invention, a protocol processing unit, which can perform both ciphering and transmitted data processing at the same time, does not transmit ciphered data to a memory, but directly transmits to an RF communication unit, a physical layer, by adding a MAC header, so that the number of times memory is accessed is reduced, thereby increasing the data processing speed

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the 3GPP standard, the term "cipher" is used for ciphering in an uplink, and the term "decipher" is used for ciphering in a downlink, but in the present invention, the term "cipher" or "ciphering" is used for both "cipher" and "decipher" for the convenience of illustration.

In addition, the ciphering algorithm described in the present invention can be "kasumi" or "snow 3G", but the present invention is not limited to such examples, and can include any method that can cipher data transmitted in the transmission and reception terminal.

Figure 1:
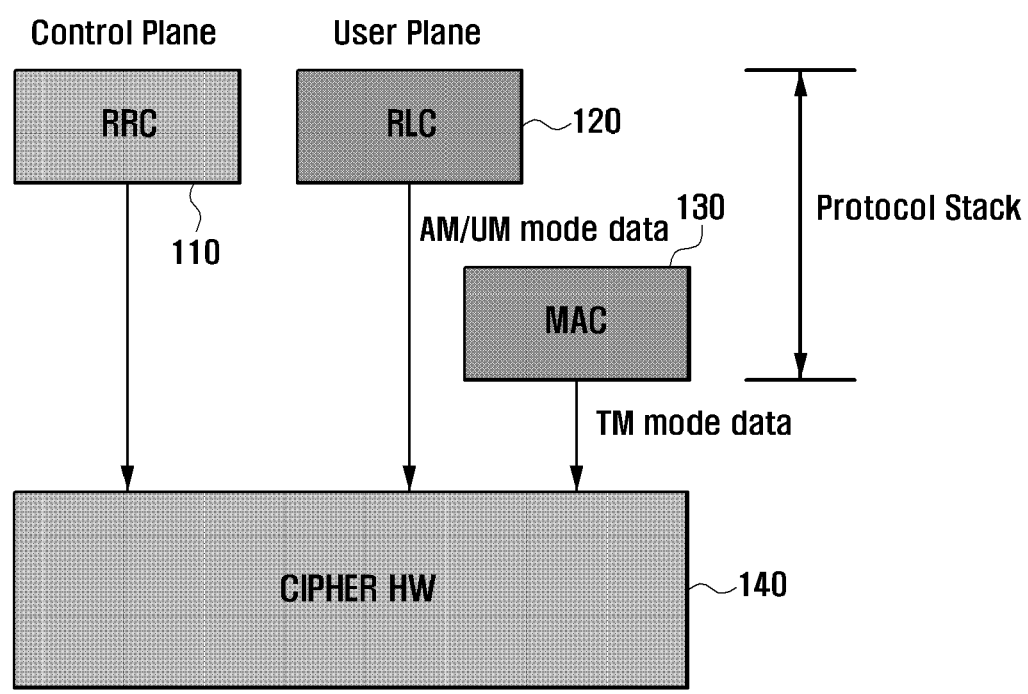
FIG. 1 illustrates cipher hardware, which ciphers data according a ciphering command received from each layer according to the prior art.

FIG. 1 illustrates cipher hardware, which ciphers data according to a ciphering command received from each layer according to the prior art.

As mentioned above, in security level 1 of the wireless communication system of the present invention, the wireless protocol in charge of data transmission can be classified into a RRC layer 110, a RLC layer 120 and a MAC sub-layer 130 or the like. In this case, in the RRC layer 110, a control message is transmitted, and in the RLC 120 and the MAC 130 sub-layer, user data is transmitted. Particularly, the data transmission method when transmitting user data is classified into UM (Unacknowledge Mode), AM (acknowledge Mode), and TM (Transparent Mode), and UM/AM mode data is ciphered in RLC layer and TM mode data is ciphered in MAC layer.

To this end, each protocol and sub-layer 110, 120 and 130 illustrated in FIG. 1 transmits information for data to be ciphered and a cipher command to a cipher hardware 140. Then, the cipher hardware 140 receives a cipher command from each layer, reads data to be ciphered from the memory and ciphers the data. In addition, the cipher hardware 140 transmits the ciphered data to the memory and stores the data in the memory.

Further, ciphered data is finally transmitted to the MAC sub-layer for transmission, and in this case, the MAC sub-layer generates a MAC packet by adding a MAC header to transmitted ciphered data, and outputs the generated MAC packet to the RF transmission and reception unit. Here, the RF transmission and reception unit may correspond to the physical layer (PHY).

In this case, there is a disadvantage in that an additional memory accessing process is required in order for ciphered data to be transmitted to the MAC sub-layer, and the data processing is delayed due to the additional memory access. Such a problem is described in detail in FIG. 2.

Figure 2:
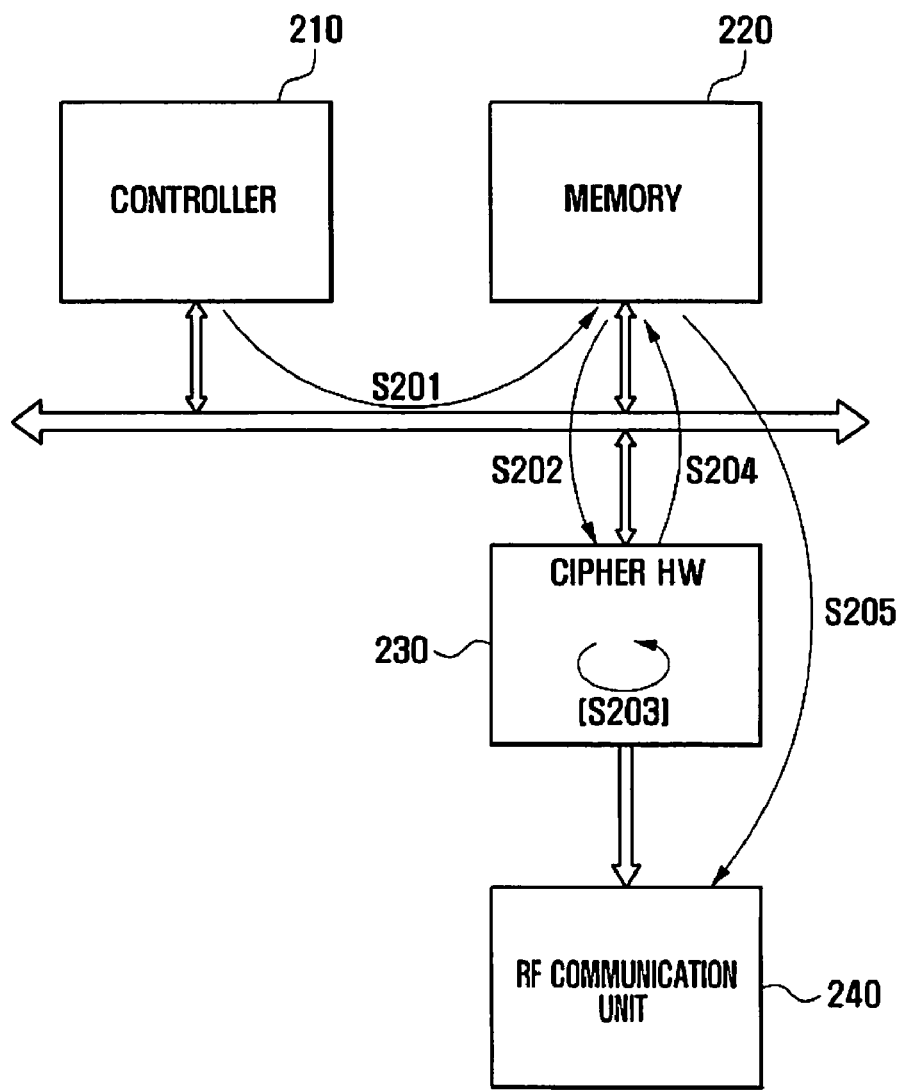
FIG. 2 illustrates memory being accessed a number of times and a data transmission path according to a ciphering process and a MAC header adding process in order to explain the problem in the prior art.

FIG. 2 illustrates the number of times memory must be accessed and a data transmission path according to a ciphering process and a MAC header adding process in order to explain the problem of the prior art.

The controller 210 illustrated in FIG. 2 controls the data generation, processing and ciphering processes in each protocol layer. Accordingly, if data is generated in each layer, the controller 210 stores the generated data in step S201.

Thereafter, the controller 210 transmits ciphering-related information to the ciphering hardware 230. Here, the ciphering-related information includes a ciphering parameter and a memory address where data to be ciphered is stored.

Additionally, the cipher hardware 230 accesses the memory and reads data to be ciphered using memory address information in step S202. In addition, the ciphering hardware 230 ciphers data, which is read from the memory according to a cipher function in step S203, and writes the ciphered data in the memory 220 in step S204.

Thereafter, when the cipher hardware 230 receives a packet generation and transmission command from the MAC sub-layer, the cipher hardware 230 accesses the memory 220 again, reads the ciphered data, and transmits the data to the RF communication unit 240 of the physical layer 240 (PHY).

Considering the data ciphering and transmission processing process, the cipher hardware 230 accesses the memory in steps S202, S204 and S205. In other words, according to the prior art, three memory accesses are needed for data ciphering and transmission processing.

As stated above, as the number of times of accessing the memory increases, the data processing is delayed. Thus, a method of reducing the number of times memory is accessed in the data ciphering and transmission processing process and a structure of a transceiver for performing the method is desirable.

Figure 3:
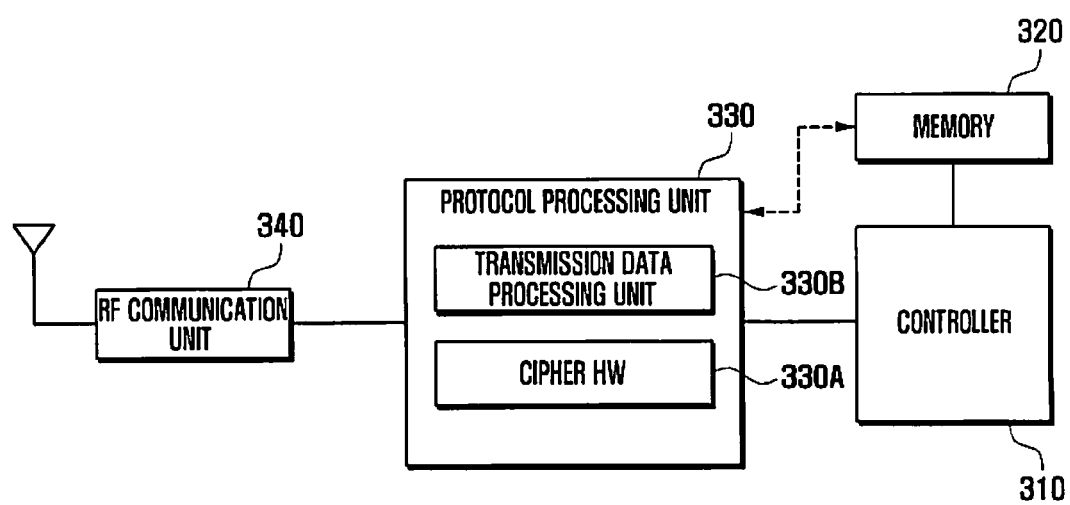
FIG. 3 is a block diagram illustrating a structure of a transmission and reception device, which can perform data ciphering according to an embodiment of the present invention.

FIG. 3 is a block diagram illustrating a structure of a transceiver, which can perform data ciphering according to an embodiment of the present invention.

As illustrated in FIG. 3, the transceiver may include a controller 310, a memory 320, a protocol processing unit 330, and a RF communication unit 340. In this case, the protocol processing unit 330 may functionally further include a cipher hardware 330A and a transmission data processing unit 330B.

The below-described protocol processing unit 330, which, according to the present invention is implemented by hardware logic, not by software. In case the ciphering process of the protocol processing unit 330 is implemented by software, the CPU or DMAC (Direct Memory Access Controller) should write ciphered data in the original memory. Hence, in order to directly transmit the ciphered data to the physical layer, the protocol processing unit 330, which performs ciphering, should be implemented by hardware logic.

The controller 310 controls the overall operation of a transmitter or a receiver. Particularly, the controller 310 according to an embodiment of the present invention generates a ciphering command of each layer corresponding to RRC (Radio Resource Control), RLC (Radio Link Control) and MAC (Media Access Control) in security level 1. In addition, the controller 310 transmits information for data to be ciphered and the ciphering command to the protocol processing unit 330. Here, information for data to be ciphered includes a ciphering parameter and a memory address where data to be ciphered is stored.

The memory 320 stores data, which is processed in each layer according to the controller 310. The data is ciphered by the protocol processing unit 330.

As stated above, the protocol processing unit 330 is implemented by hardware logic in order to directly transmit ciphered data to the physical layer. Additionally, according to an embodiment of the present invention, the protocol processing unit 330 may be an LMAC (Lower MAC), which processes some functions of the MAC layer and RLC layer by hardware.

The LMAC can be defined as a hardware accelerator of the second layer (MAC and RLC) of the wireless connection protocol. When processing each of the layers, the LMAC processes some functions of the MAC layer and RLC layer by hardware because the existing implementation method, using only software, delays the data processing due to the large number of memory accesses.

Further, the protocol processing unit 330 receives a ciphering command and information on data to be ciphered from the controller 310. Then, the protocol processing unit 330 reads data from the memory 320 using a memory address where data to be ciphered is stored. The protocol processing unit 330 includes a separate control block in order to perform such a process, but the control block is not illustrated in drawings for convenience of illustration.

According to an embodiment of the present invention, the protocol processing unit 330 may further include a cipher hardware 330A and a transmission data processing unit 330B. The cipher hardware 330A ciphers data, which the protocol processing unit 330 read from the memory 320. In this case, the cipher hardware 330A performs ciphering using a cipher parameter, which is received from the controller 310. In this case, the cipher hardware 330A can perform ciphering using ciphering algorithms of "kasumi" or "snow 3G", but the present invention is not limited to such examples, and can include any method which can cipher data transmitted from the transmission and reception terminal.

Additionally, the cipher hardware 330A directly transmits ciphered data to the transmission data processing unit 330B according to an embodiment of the present invention. In case such blocks are implemented by software, the ciphered data cannot be directly transmitted to the transmission data processing unit 330B, and must necessarily be written in the memory 320. Hence, in the present invention, in order to transmit ciphered data directly to the transmission data processing unit 330B, the protocol processing unit 330 including the cipher hardware 330A and the transmission data processing unit 330B is implemented in hardware.

The transmission data processing unit 330B receives ciphered data transmitted from the cipher hardware 330A. Additionally, the transmission data processing unit 330B generates a packet by adding a header for transmission to the ciphered data, and outputs the packet to an RF communication unit 340, which is a physical layer. The ciphered data is finally transmitted to the MAC layer for transmission, and the MAC header is added to the ciphered data in the MAC layer. Hence, the header, which is added to the ciphered data by the transmission data processing unit 330B, is a MAC header, and the generated packet is a MAC packet.

Additionally, the transmission data processing unit 330B adds an MAC header to the ciphered data, and then outputs the data to the RF communication unit 340, which is a physical layer.

As stated above, the protocol processing unit 330 of the present invention adds a MAC header to ciphered data, and directly outputs the data to the RF communication unit 340, which is a physical layer. Hence, according to the present invention, the process of storing ciphered data in the memory and accessing the memory again for adding a MAC header can be omitted, so that the number of times of memory accesses can be reduced, thereby increasing the data processing speed.

The RF communication unit 340 corresponds to a physical layer (PHY) among layers of the wireless connection protocol, and receives data directly transmitted from the protocol processing unit 330, and transmits the received data.

Figure 4:
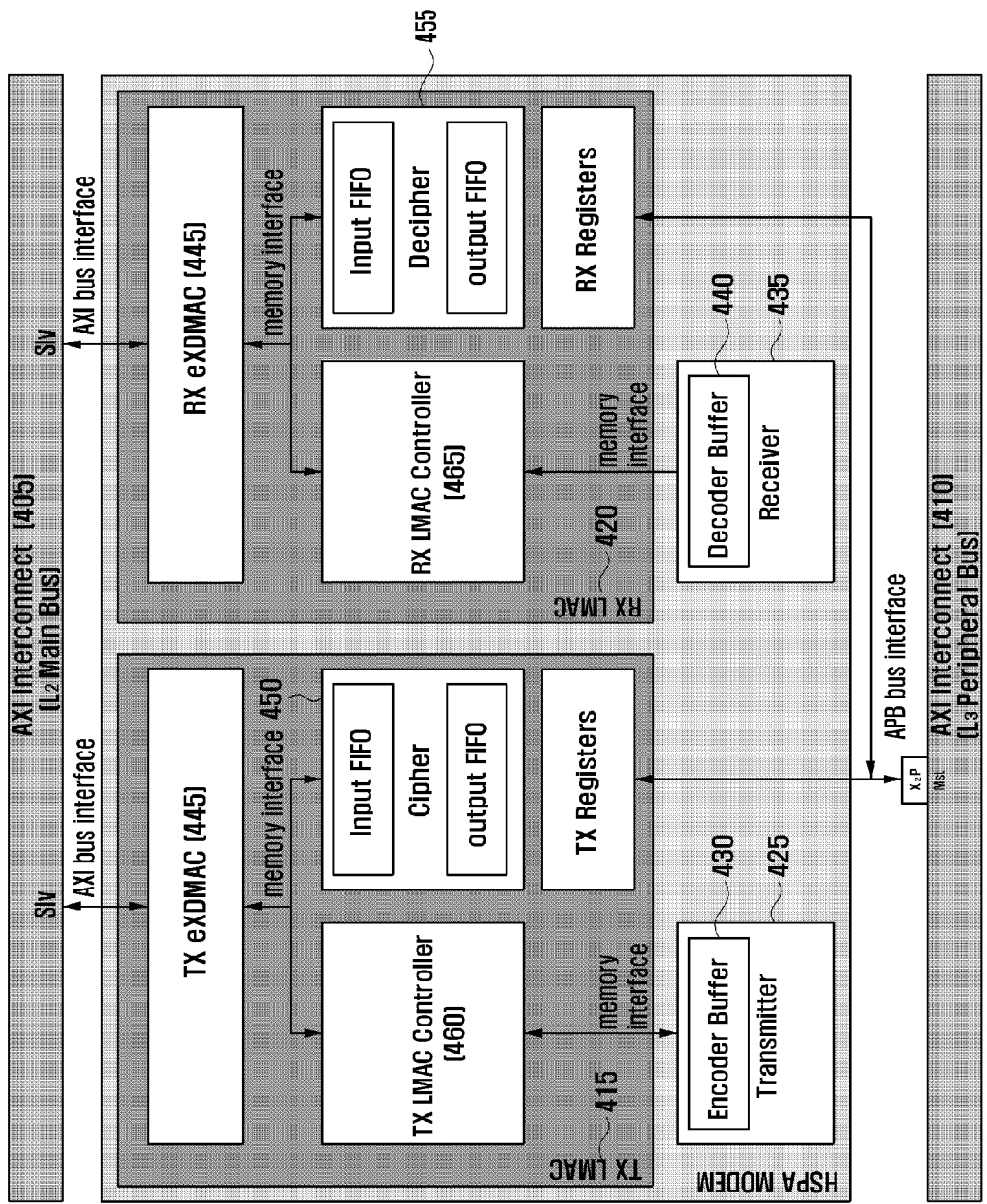
FIG. 4 is a block diagram illustrating a structure of a Lower MAC (LMAC), which is an implementation of a protocol processing unit 330 as actual hardware logic.

FIG. 4 is a block diagram illustrating a structure of an LMAC, which is an implementation of a protocol processing unit 330 as actual hardware logic. FIG. 4 illustrates a structure of both a transmission LMAC 415 and a reception LMAC 420, but the protocol processing unit 330 illustrated in FIG. 3 may correspond to only the transmission LMAC 415.

Hereinafter, an LMAC including both the transmission LMAC 415 and the reception LMAC 420 is illustrated. As illustrated in FIG. 4, the LMAC reads and writes data through AXI L2 main bus 405 and reads and writes registers through L3 peripheral bus 410. The LMAC is classified into a transmission path (TX path) and a reception path (RX path), and is designed to correspond to the transmission LMAC (TX LMAC) 415 for the transmission path and to the reception LMAC (RX LMAC) 420 for the reception path.

The transmission LMAC (TX LMAC) 415 interfaces an encoder buffer 430 of a modem transmitter 425, and the reception LMAC (RX LMAC) 420 interfaces a modem receiver 435, which consists of memory interfaces and is designed to process burst data.

Considering the contents of the LMAC, the LMAC consists of the transmission LMAC 415 and the reception LMAC 420, and each has structurally the same format. Structurally an eXDMAC 445 externally reads and writes a memory through AXI master port, and internally reads and writes data through cipher/decipher input FIFO 450 and 455 and encoder/decoder buffer 430 and 440. TX/RX LMAC controller 460 and 465 controls all functions based on R99/R6/R7, which needs to be provided in TX/RX LMAC 415 and 420.

If the protocol processing unit 330 of FIG. 3 and the actual block diagram of FIG. 4 are compared, the ciphering unit 330A of FIG. 3 corresponds to Cipher 450 of FIG. 4, and the transmission data processing unit 330B of FIG. 3 may correspond to the transmission LMAC controller 460 and eXDMAC 445 of FIG. 4.

Figure 5:
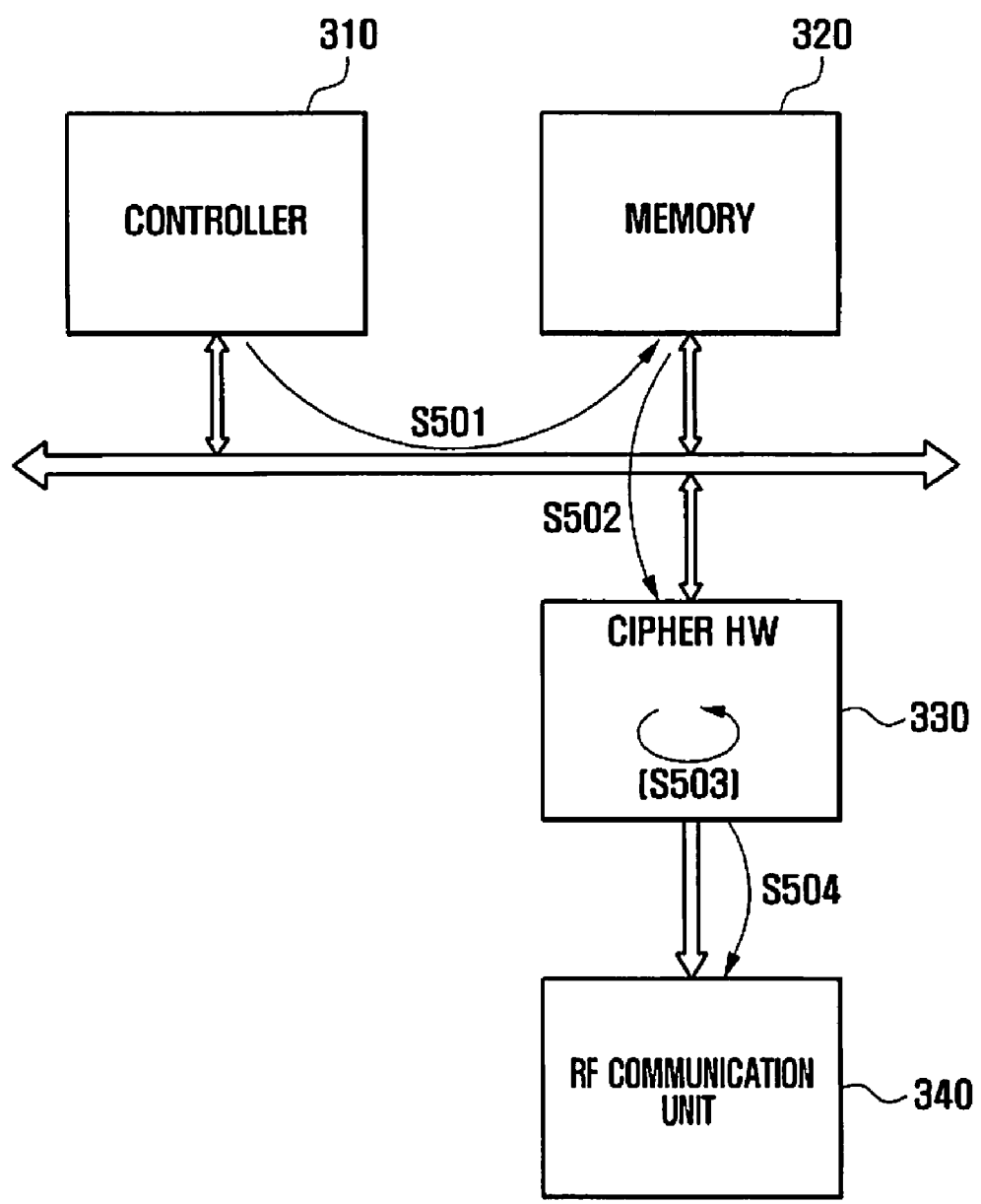
FIG. 5 illustrates the number of times memory is accessed and a data transmission path for a ciphering process and a MAC header adding process according to an embodiment of the present invention.

FIG. 5 illustrates the number of times of accessing a memory and a data transmission path for a ciphering process and a MAC header adding process according to an embodiment of the present invention.

The controller 310 illustrated in FIG. 5 controls the data generation, processing and ciphering process in each protocol layer. As such, if data is generated in each layer, the controller 310 stores the generated data in a memory 320 in step S501.

Thereafter, the controller 310 transmits ciphering-related information to the protocol processing unit 330. Then, the protocol processing unit 330 accesses the memory 320 and reads data to be ciphered in step S502. The protocol processing unit 330 ciphers data, which was read from the memory according to the ciphering, function in step S503. Thereafter, the protocol processing unit 330 generates a packet (MAC packet) by adding a header in order to transmit the ciphered data. In addition, the protocol processing unit 330 directly transmits the generated packet to the RF communication unit 340, which operates at the physical layer.

If the above point is compared with FIG. 2, according to the existing ciphering method illustrated in FIG. 2, in order to generate a data packet for transmission, three memory accesses in steps S202, S204 and S205 were needed. However, according to the ciphering method illustrated in FIG. 5, according to the present invention, only one memory access in step S502 is required in order to generate a data packet for transmission. Hence, in the present invention, when the protocol processing unit 330 ciphers data, the number of times of memory accesses is reduced, thereby increasing the data processing speed.

Figure 6:
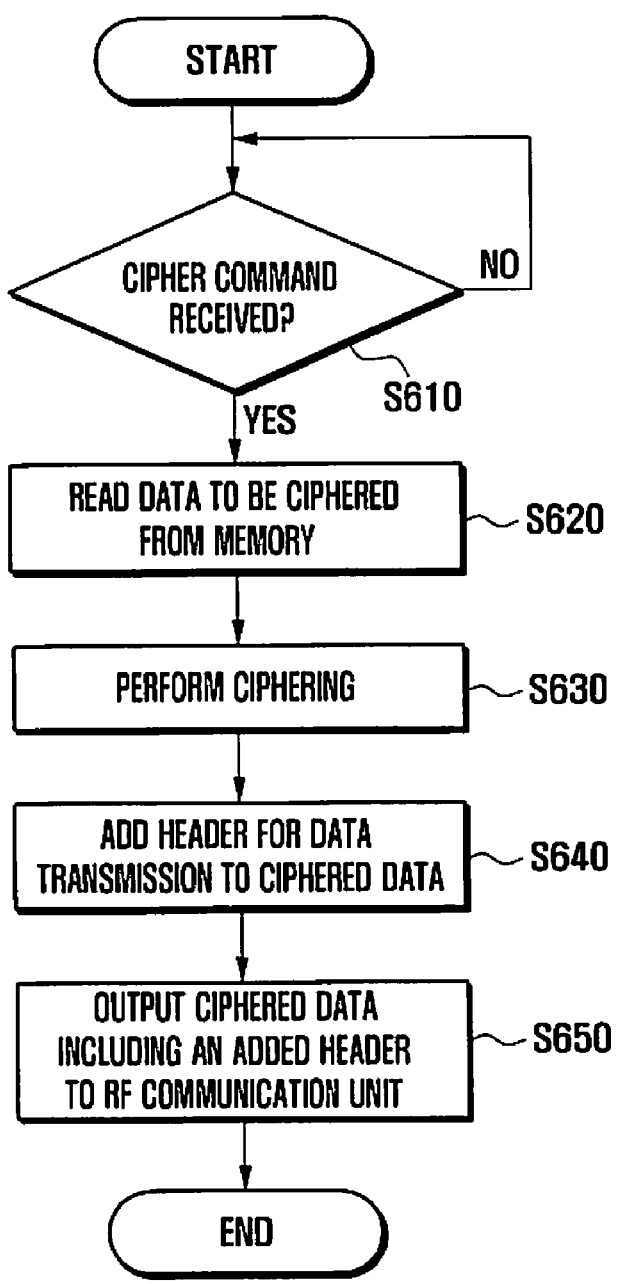
FIG. 6 is a flowchart illustrating an operation of a protocol processing unit 330 according to an embodiment of the present invention.

FIG. 6 is a flowchart illustrating an operation of a protocol processing unit 330 according to an embodiment of the present invention.

First, the protocol processing unit 330 determines whether a cipher command and information for data to be ciphered were received from each layer in step S610. In case a cipher command is not received, a standby state is maintained until a cipher command is received.

If a cipher command is received, the protocol processing unit 330 reads data from the memory 320 using a memory address where data to be ciphered is stored in step S620. In addition, the protocol processing unit 330 controls the cipher hardware 330A, which the protocol processing unit 330 has to perform ciphering in step S630.

In this case, the cipher hardware 330A performs ciphering using a cipher parameter which is received from each layer, and can use a ciphering algorithm of "kasumi" or "snow 3G".

A MAC header should be added to ciphered data for transmission, and the protocol processing unit 330 controls the transmission processing unit 330B to generate a MAC packet by adding a MAC header to the ciphered data in step S640. In addition, the protocol processing unit 330 controls the transmission data processing unit 330B to directly transmit the generated MAC packet to the RF communication unit 340 which at the physical layer.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus for ciphering data in a wireless communication system, the apparatus comprising:
    a memory, which stores data to be ciphered;
    a controller, which outputs a cipher command for each layer of a wireless protocol;
    a protocol processing unit which comprises a cipher hardware, which receives the cipher command outputted from the controller, reads data to be ciphered from the memory, ciphers the data and directly outputs the ciphered data for transmission processing, and a transmission data processing unit, which receives the ciphered data directly from the cipher hardware, adds a header to the ciphered data for transmission and generates a data packet having the header and the ciphered data; and
    a Radio Frequency (RF) communication unit, which receives the generated data packet directly from the transmission data processing unit and transmits the generated data packet.

2. The apparatus of claim 1, wherein the cipher command includes information on data to be ciphered.

3. The apparatus of claim 2, wherein information on data to be ciphered comprises a cipher parameter and a memory address where data to be ciphered is stored.

4. The apparatus of claim 1, wherein the ciphering is performed by one of a Radio Resource Control (RRC) layer, a Radio Link Control (RLC) layer and a Media Access Control (MAC) sub-layer.

5. A method of ciphering data in a wireless communication system, the method comprising:
    reading data to be ciphered from a memory, when receiving a cipher command by a cipher hardware;
    ciphering the read data at the cipher hardware and directly outputting the ciphered data from the cipher hardware to a transmission data processing unit;
    receiving the ciphered data directly from the cipher hardware at the transmission data processing unit, and generating a data packet, by the transmission data processing unit, by adding a header to the ciphered data for transmission; and
    receiving the generated data packet directly from the transmission data processing unit at a Radio Frequency (RF) communication unit and transmitting the generated data packet by the RF communication unit.

6. The method of claim 5, wherein, in receiving a cipher command, the cipher hardware receives the cipher command and information on data to be ciphered.

7. The method of claim 6, wherein the information on the data to be ciphered comprises a cipher parameter and a memory address where data to be ciphered is stored.

8. The method of claim 5, wherein the ciphering is performed with respect to one of a Radio Resource Control (RRC) layer, a Radio Link Control (RLC) layer and a Media Access Control (MAC) sub-layer.

* * * * *